(12) United States Patent
Roh et al.

(10) Patent No.: US 9,768,473 B2
(45) Date of Patent: Sep. 19, 2017

(54) BATTERY PACK OF IMPROVED SAFETY

(71) Applicant: LG CHEM, LTD., Seoul (KR)

(72) Inventors: Tae Hwan Roh, Daejeon (KR); Jin Kyu Lee, Daejeon (KR); Jun Seok Choi, Daejeon (KR); Seong Tae Kim, Daejeon (KR); Tae Hyuck Kim, Daejeon (KR); Dongyeon Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 759 days.

(21) Appl. No.: 14/276,539

(22) Filed: May 13, 2014

(65) Prior Publication Data

US 2014/0248523 A1 Sep. 4, 2014

Related U.S. Application Data

(63) Continuation of application No. PCT/KR2013/000584, filed on Jan. 25, 2013.

(30) Foreign Application Priority Data

Jan. 26, 2012 (KR) .......................... 10-2012-0007614

(51) Int. Cl.
*H01M 2/34* (2006.01)
*H01M 10/42* (2006.01)
(Continued)

(52) U.S. Cl.
CPC ....... *H01M 10/425* (2013.01); *H01M 2/1016* (2013.01); *H01M 2/1022* (2013.01);
(Continued)

(58) Field of Classification Search
CPC .............................. H01M 2/34; H01M 2/345
(Continued)

(56) References Cited

U.S. PATENT DOCUMENTS 2,198,947 A * 4/1940 Olson .................... A63G 11/00
472/112
6,090,501 A 7/2000 Souliac et al.
(Continued)

FOREIGN PATENT DOCUMENTS

EP 0 910 104 A1 4/1999
EP 2 741 348 A1 6/2014
(Continued)

OTHER PUBLICATIONS

International Search Report issued in PCT/KR2013/000584, dated Apr. 19, 2013.

*Primary Examiner* — Jonathan G Leong
(74) *Attorney, Agent, or Firm* — Birch, Stewart, Kolasch & Birch, LLP

(57) ABSTRACT

Disclosed is a battery pack configured such that a plurality of battery modules is connected to each other in series in a state in which the modules are in contact with each other or stacked adjacent to each other, the pack being fixed such that a stacked state of the modules is maintained even when volume of the modules is changed during charge and discharge, the pack including a cut-off portion connected in series to an electrical connection circuit between modules, a fixing member to fix a circuit breaker to at least one outer surface of the pack, and the breaker configured to be electrically conducted when an outer surface of at least one module expands by a reference volume value or more, the breaker being connected in series to the electrical connection circuit to short-circuit the cut-off portion when electric conduction is performed due to swelling of the modules.

17 Claims, 13 Drawing Sheets

(51) Int. Cl.
*H01M 2/10* (2006.01)
*H01H 35/00* (2006.01)
*H01H 1/58* (2006.01)

(52) U.S. Cl.
CPC ........... *H01M 2/1077* (2013.01); *H01M 2/34* (2013.01); *H01M 2/345* (2013.01); *H01H 35/006* (2013.01); *H01H 2001/5877* (2013.01); *H01M 2010/4271* (2013.01); *H01M 2220/20* (2013.01)

(58) Field of Classification Search
USPC .................................................. 429/121, 150
See application file for complete search history.

(56) References Cited

U.S. PATENT DOCUMENTS

| | | | |
|---|---|---|---|
| 6,295,189 B1 | 9/2001 | Perelle et al. | |
| 9,455,436 B2* | 9/2016 | Roh | H01M 2/34 |
| 2005/0077878 A1 | 4/2005 | Carrier et al. | |
| 2006/0267545 A1 | 11/2006 | Lee et al. | |
| 2011/0014512 A1* | 1/2011 | Amagai | H01M 2/0217 429/159 |
| 2011/0037430 A1 | 2/2011 | Jang | |
| 2011/0039147 A1* | 2/2011 | Cheon | H01M 2/206 429/159 |
| 2014/0127549 A1 | 5/2014 | Roh et al. | |

FOREIGN PATENT DOCUMENTS

| | | |
|---|---|---|
| JP | 2000-208170 A | 7/2000 |
| JP | 2003-197268 A | 7/2003 |
| JP | 2004-39512 A | 2/2004 |
| JP | 2004-319463 A | 11/2004 |
| JP | 2014-523627 A | 9/2014 |
| KR | 10-2006-0114549 A | 11/2006 |
| KR | 10-2006-0116424 A | 11/2006 |
| KR | 10-2009-0113521 A | 11/2009 |
| WO | WO 2009/066880 A2 | 5/2009 |

* cited by examiner

[FIG. 1]
50
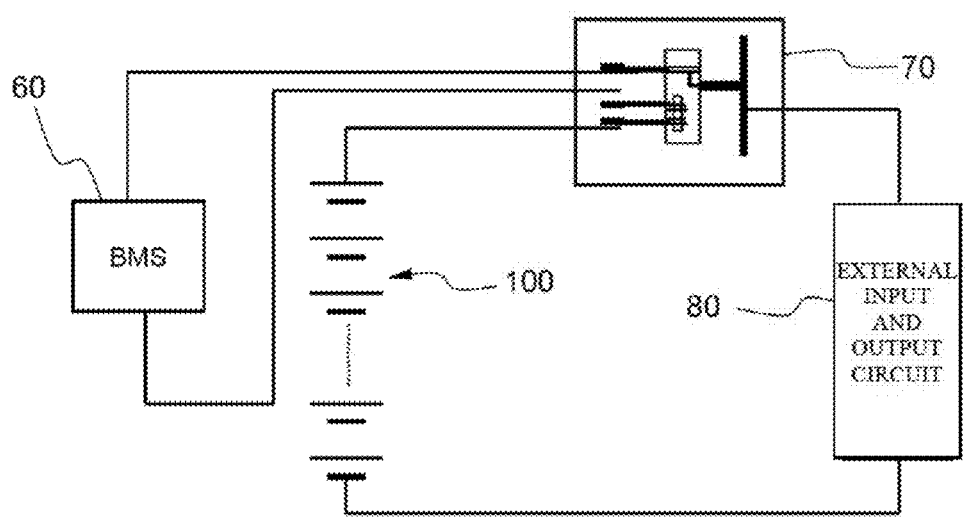

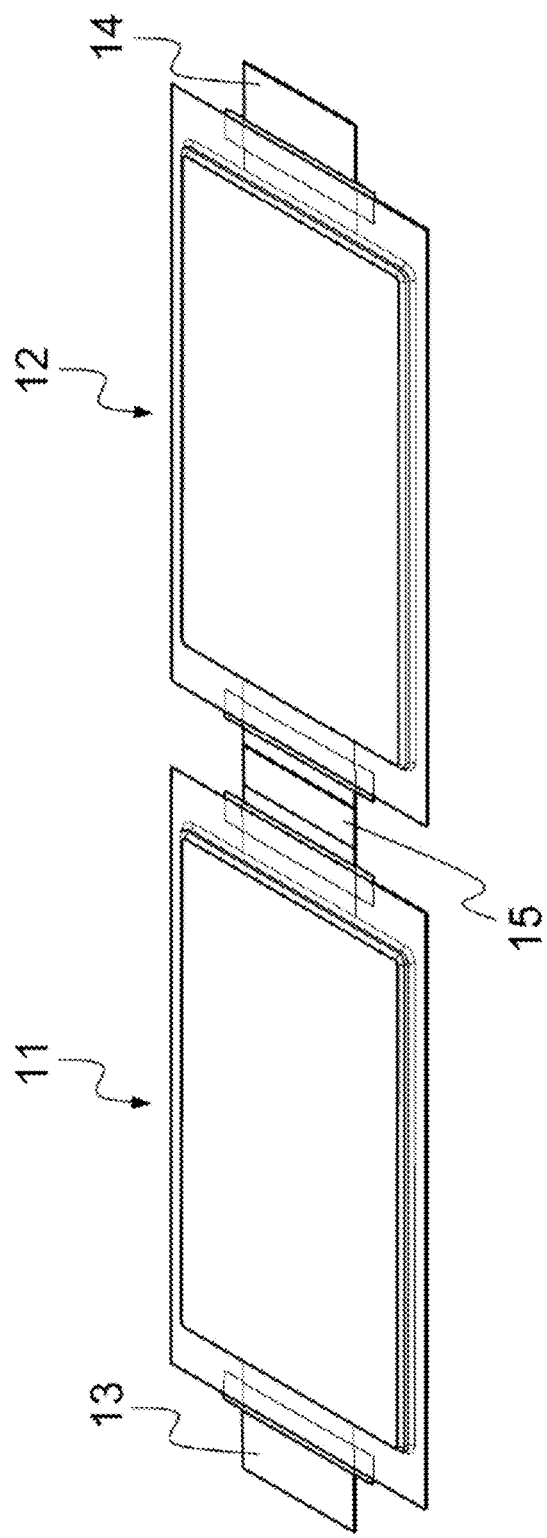
[FIG. 2]

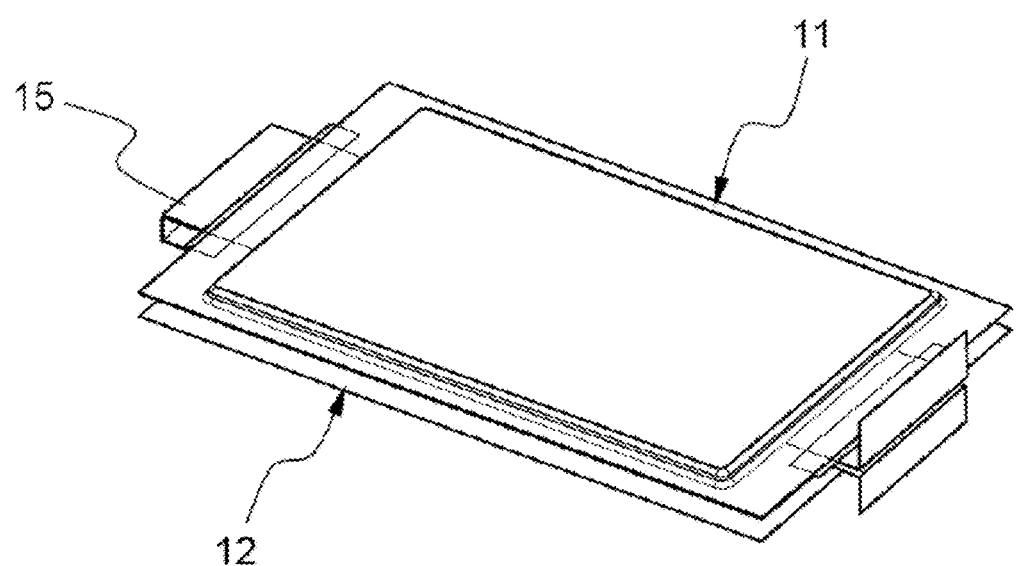

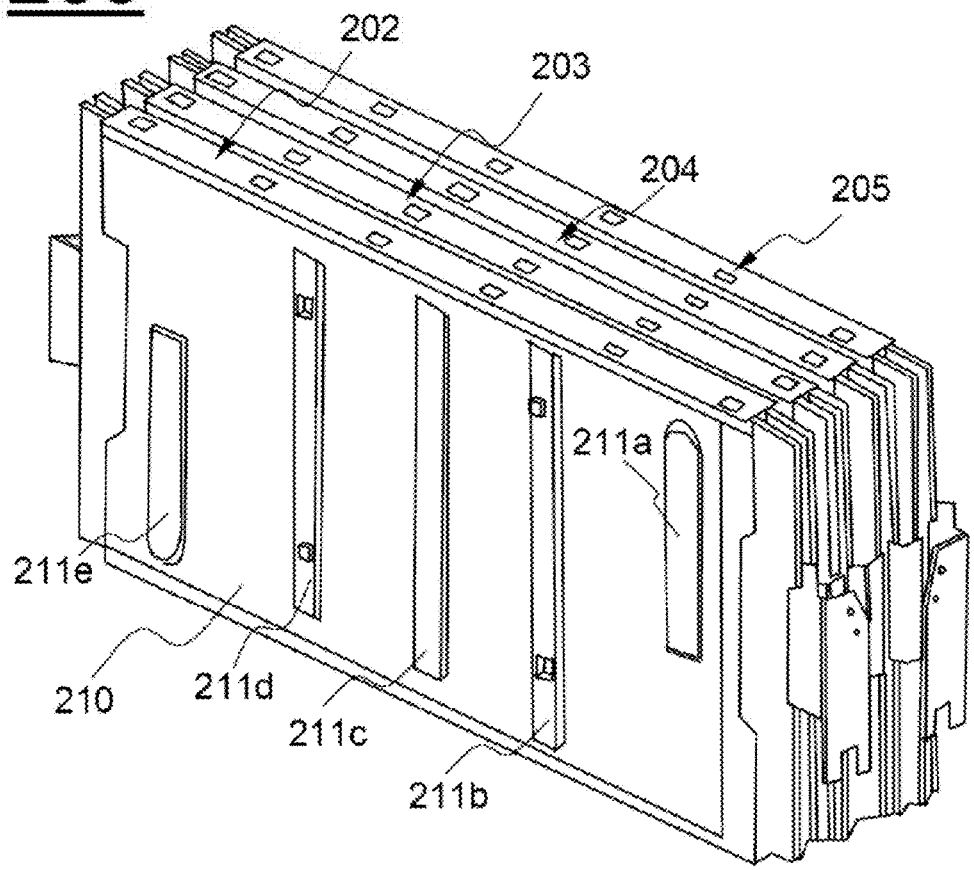
[FIG. 4]

[FIG. 5]
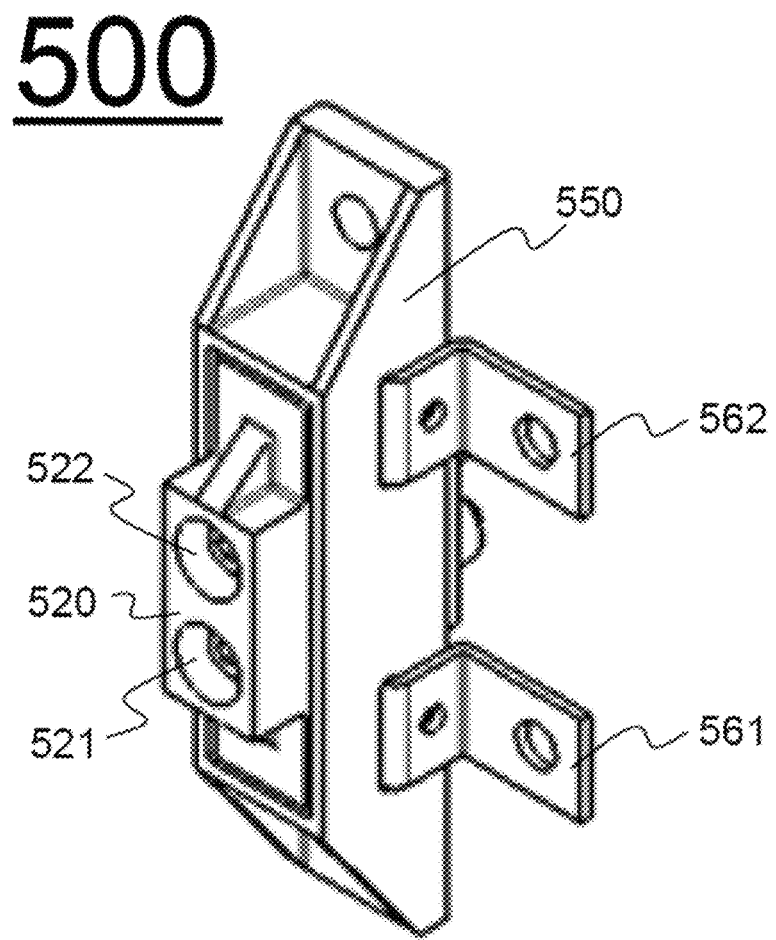

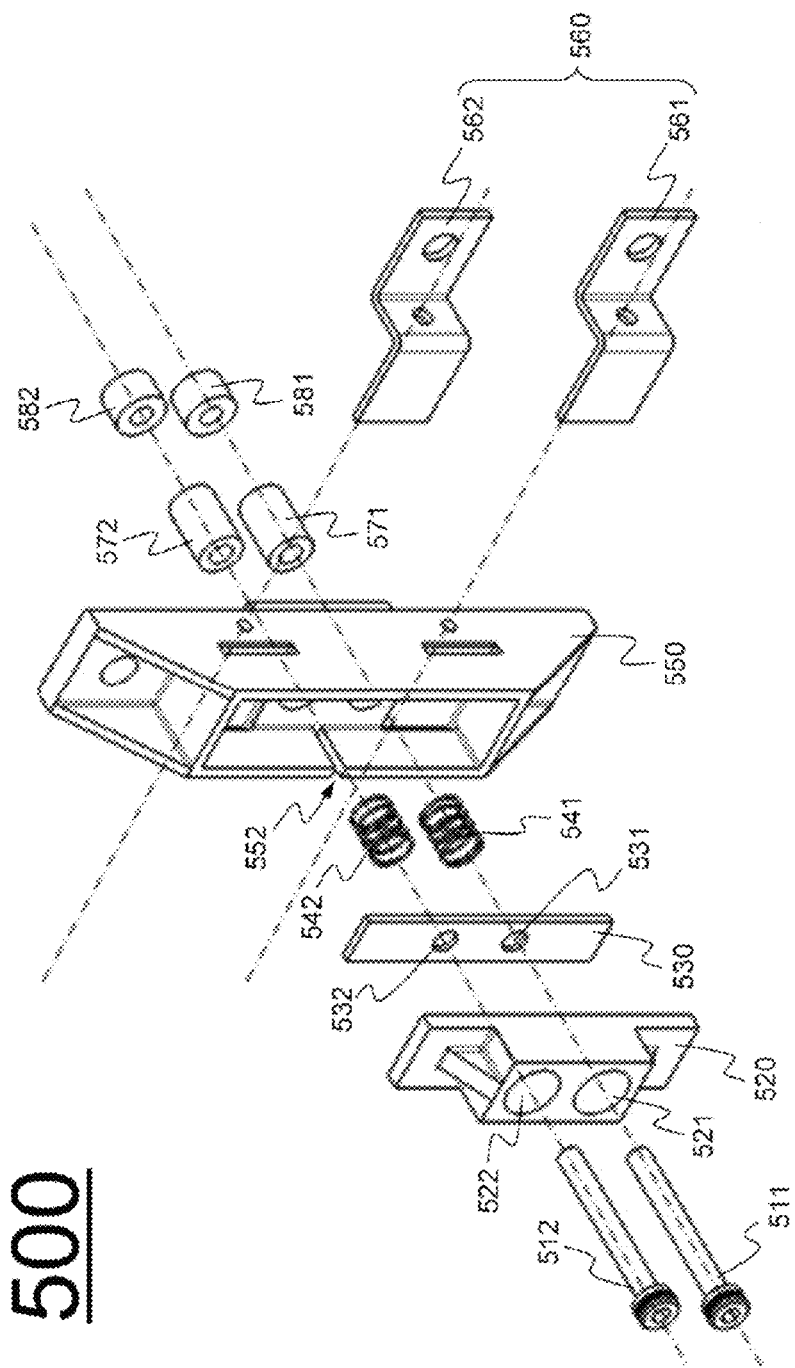

[FIG. 7]
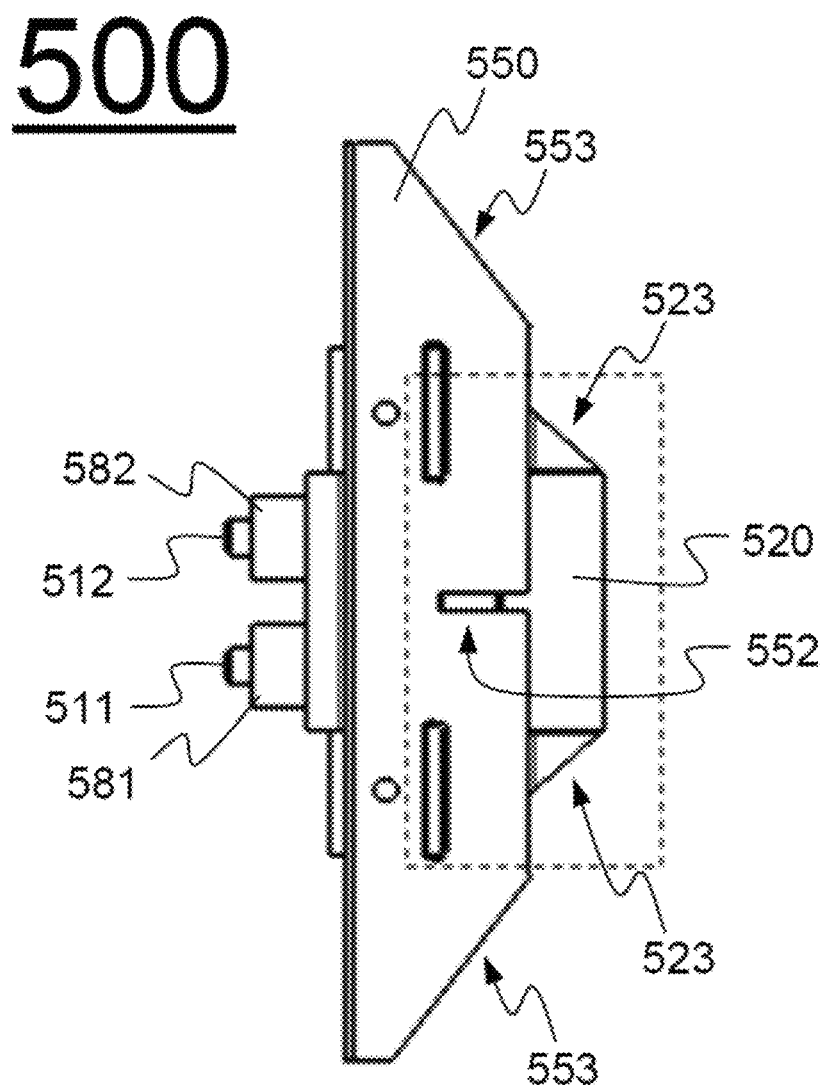

[FIG. 8]
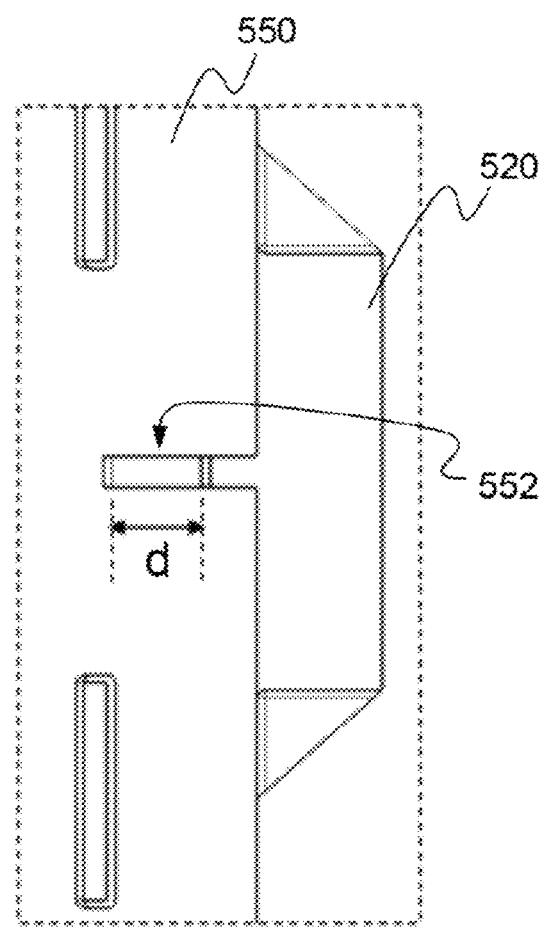

[FIG. 9]
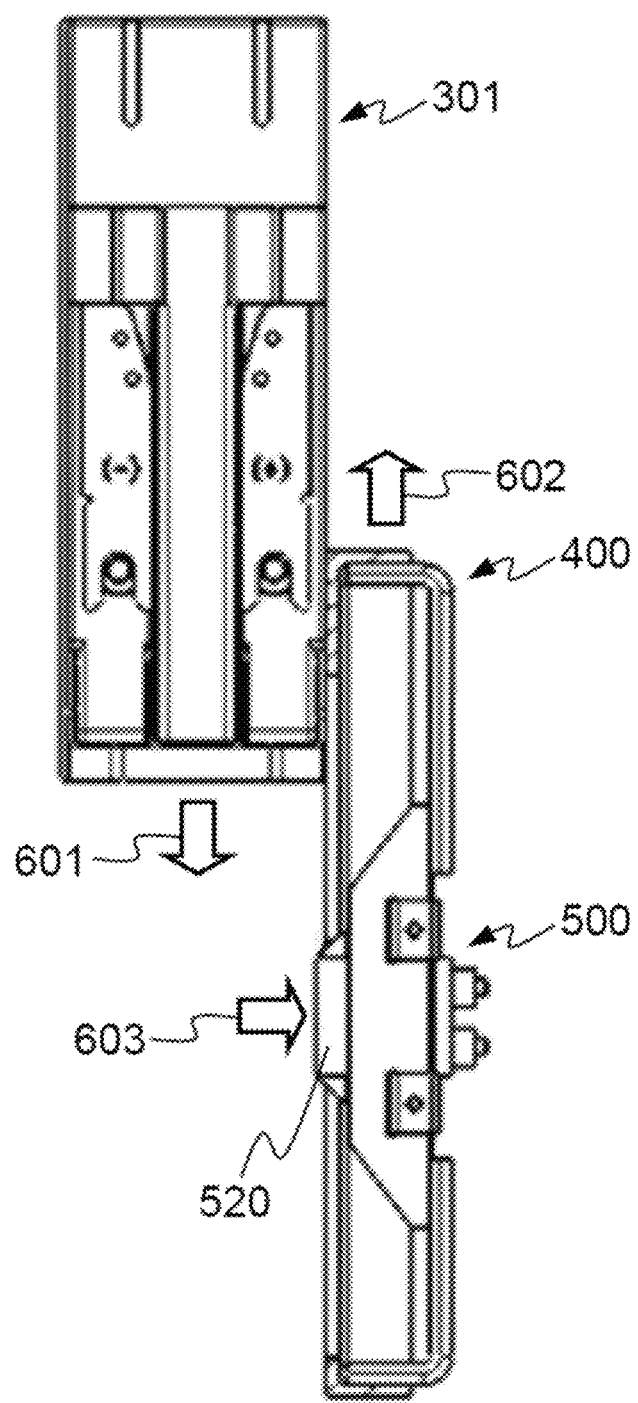

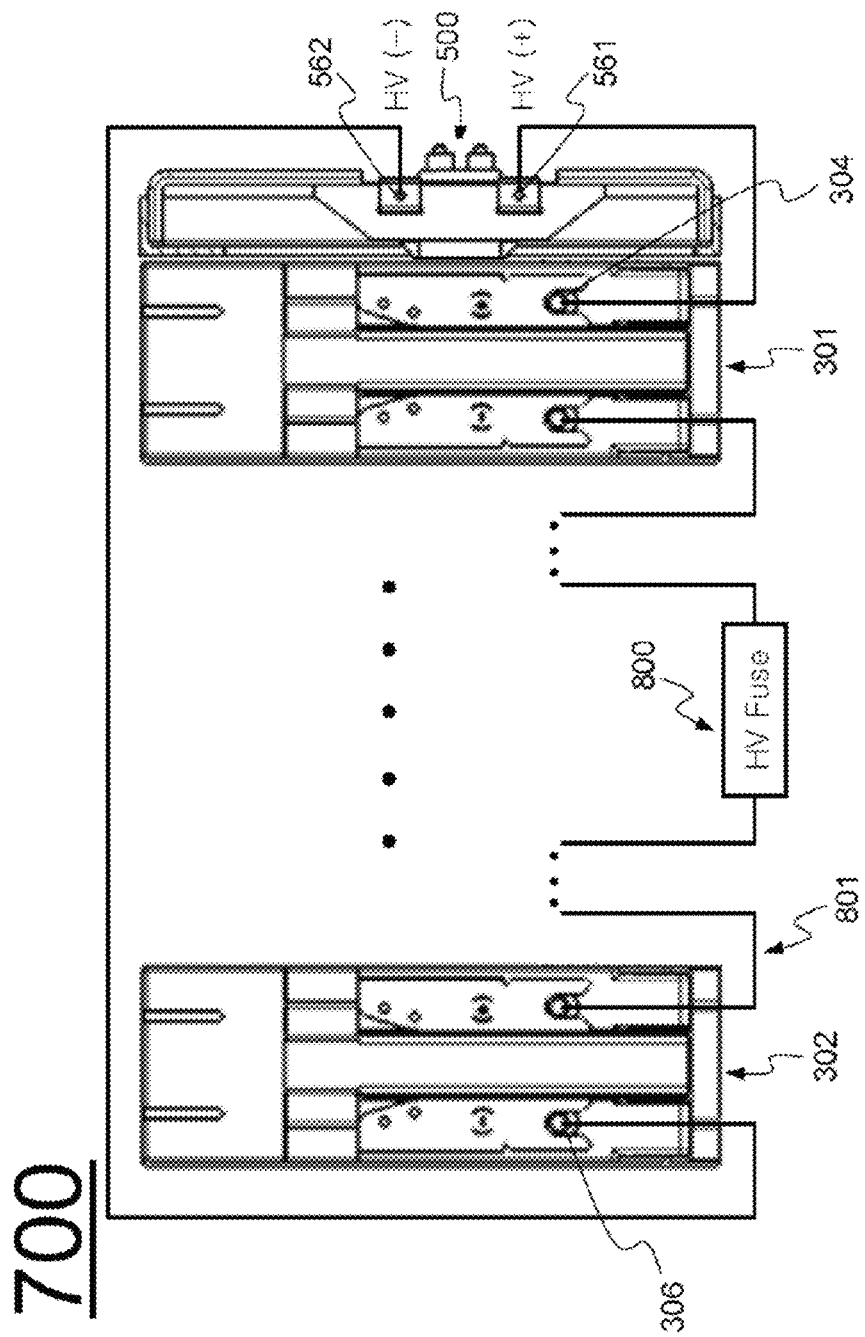
[FIG. 10]

[FIG. 11]
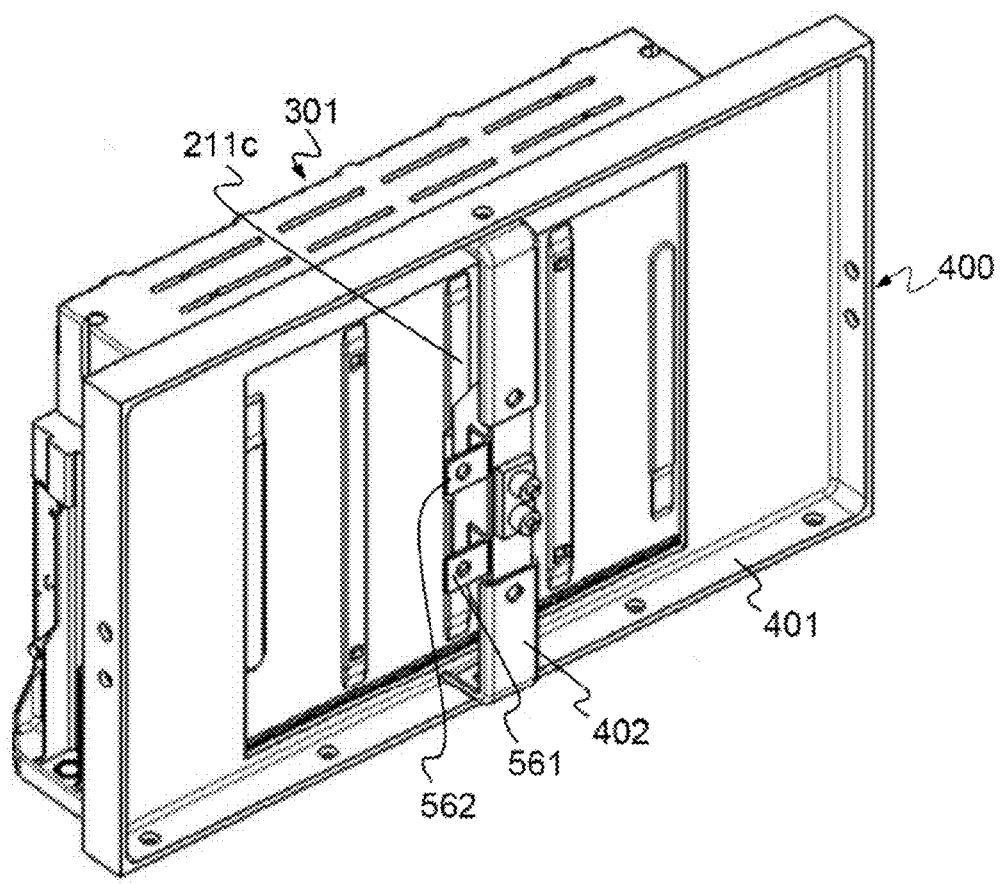

[FIG. 12]
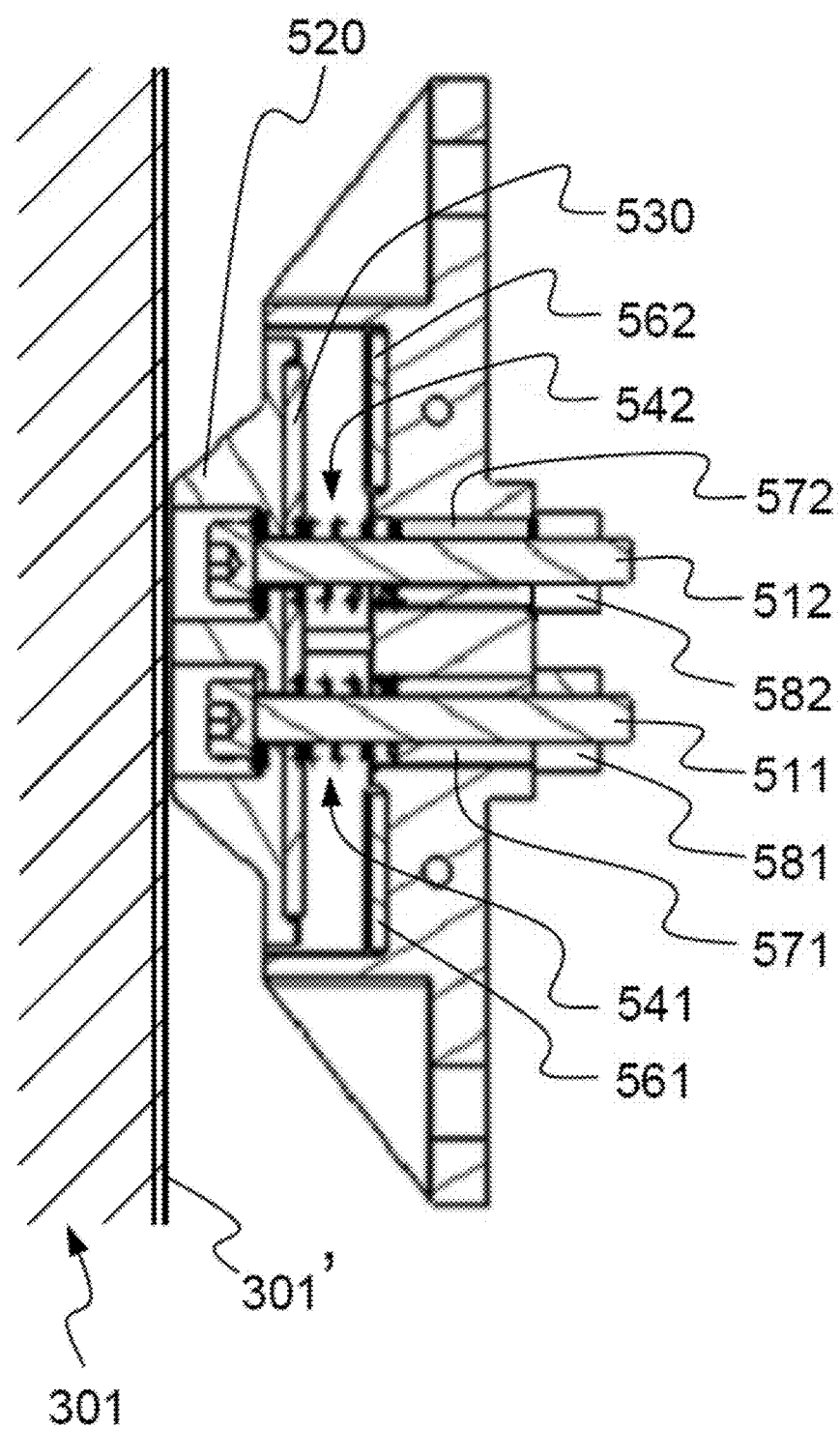

[FIG. 13]
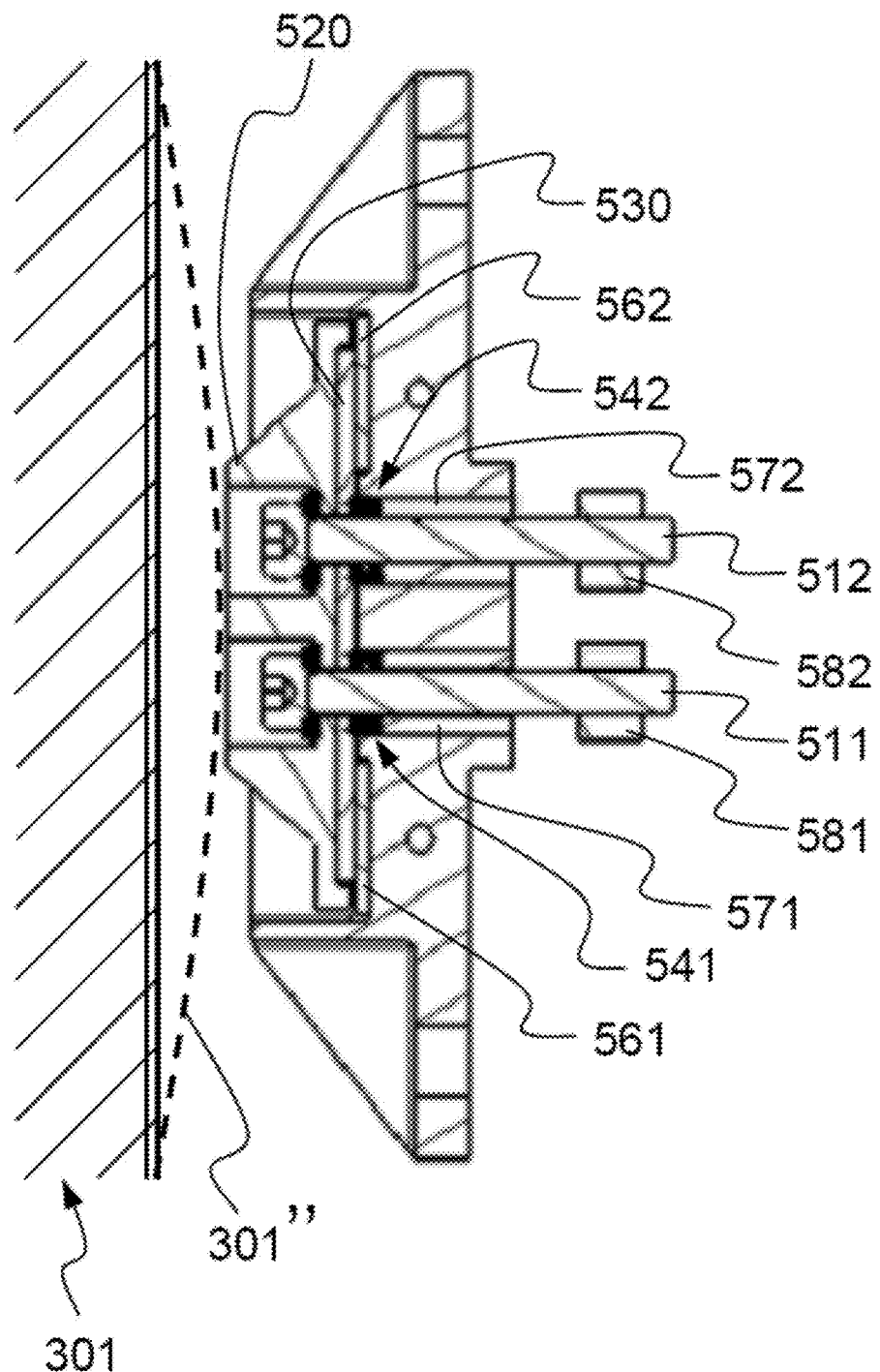

US 9,768,473 B2

BATTERY PACK OF IMPROVED SAFETY

CROSS REFERENCE TO RELATED APPLICATIONS

This application is a continuation of PCT International Application No. PCT/KR2013/000584 filed on Jan. 25, 2013, which claims priority under 35 U.S. 119(a) to application No. 10-2012-0007614 filed on Jan. 26, 2012 in the Republic of Korea, all of which are hereby expressly incorporated by reference into the present application.

TECHNICAL FIELD

The present invention relates to a battery pack with improved safety and, more particularly, to a battery pack configured such that a plurality of battery modules is connected to each other in series in a state in which the battery modules are in tight contact with each other or stacked adjacent to each other, the battery pack being fixed such that a stacked state of the battery modules is maintained even when volume of the battery modules is changed during charge and discharge of the battery modules, the battery pack including a cut-off portion connected in series to an electrical connection circuit between the battery modules, a fixing member to fix a circuit breaker to at least one outer surface of the battery pack, and the circuit breaker configured to be electrically conducted when an outer surface of at least one battery module expands by a reference volume value or more, the circuit breaker being connected in series to the electrical connection circuit to short-circuit the cut-off portion when electric conduction is performed due to swelling of the battery modules.

BACKGROUND ART

As mobile devices have been increasingly developed and the demand for such mobile devices has increased, the demand for secondary batteries has sharply increased as an energy source for the mobile devices. Among such secondary batteries is a lithium secondary battery having high energy density and discharge voltage, into which much research has been carried out and which is now commercialized and widely used.

A secondary battery has attracted considerable attention as an energy source for power-driven devices, such as an electric bicycle (E-bike), an electric vehicle (EV), and a hybrid electric vehicle (HEV), as well as an energy source for mobile wireless electronic devices, such as a mobile phone, a digital camera, a personal digital assistant (PDA), and a laptop computer.

A small-sized battery pack, in which a battery cell is mounted, is used for small-sized devices, such as a mobile phone and a digital camera. On the other hand, a middle or large-sized battery pack, in which a battery pack including two or more battery cells (hereinafter, also referred to as a "multi-cell") connected to each other in parallel and/or in series is mounted, is used for middle or large-sized devices, such as a laptop computer and an electric vehicle.

A lithium secondary battery exhibits excellent electrical properties as described above; however, the lithium secondary battery has low safety. For example, when abnormal operations, such as overcharge, overdischarge, exposure to high temperature, and electrical cut-off, of the lithium secondary battery occur, decomposition of active materials and an electrolyte, which are components of the battery, is caused with the result that heat and gas are generated and the high-temperature and high-pressure conditions caused by generation of the heat and the gas accelerate the above-mentioned decomposition. Eventually, a fire or explosion of the lithium secondary battery may occur.

For this reason, the lithium secondary battery is provided with a safety system, such as a protection circuit to interrupt electric current when the battery is overcharged or overdischarged or when overcurrent flows in the battery, a positive temperature coefficient (PTC) element whose resistance greatly increases so as to interrupt electric current when the temperature of the battery increases, and a safety vent to interrupt electric current or to exhaust gas when pressure increases due to generation of the gas. In case of a small-sized cylindrical secondary battery, for example, the PTC element and the safety vent are usually disposed at the top of an electrode assembly (a generating element) having a cathode/separator/anode structure, which is mounted in a cylindrical container. In case of a small-sized prismatic or pouch-shaped secondary battery, on the other hand, the protection circuit module and the PTC element are usually mounted at the upper end of a prismatic container or a pouch-shaped case, in which the generating element is mounted in a sealed state.

The safety-related problem of the lithium secondary battery is even more serious for a middle or large-sized battery pack having a multi-cell structure. Since a plurality of battery cells is used in the multi-cell battery pack, abnormal operation of some of the battery cells may cause abnormal operation of the other battery cells with the result that a fire or explosion of the battery pack may occur, which may lead to a large-scale accident. For this reason, the middle or large-sized battery pack is provided with a safety system, such as a battery management system (BMS), to protect the battery cells from overdischarge, overcharge, and overcurrent.

Meanwhile, as the lithium secondary battery is continuously used, i.e. as the lithium secondary battery is repeatedly charged and discharged, the generating element and electrical connection members are gradually degraded. For example, degradation of the generating element leads to decomposition of electrode materials and the electrolyte, by which gas is generated. As a result, the battery cell (the container or the pouch-shaped case) gradually swells. In a normal state of the lithium secondary battery, an active controller, such as the BMS, detects overdischarge, overcharge, or overcurrent of the battery pack. In a case in which the detected overdischarge, overcharge, or overcurrent of the battery pack is excessive, the active controller interrupts electrical connection in the battery pack to lower the risk of the battery pack.

In connection with this case, FIG. 1 is a typical view showing circuitry of a conventional battery pack. Referring to FIG. 1, a conventional battery pack 50 includes a battery module 100 constituted by a plurality of battery cells, a BMS 60 to detect information regarding an operation state of the battery module 100 and to control the battery module 100 based on the detected information, and a power connection and disconnection part (relay) 70 to perform connection and disconnection between the battery module 100 and an external input and output circuit (inverter) 80 according to an operation command of the BMS 60.

In a case in which the battery module 100 normally operates, the BMS 60 keeps the power connection and disconnection part 70 in an ON state. In a case in which abnormality of the battery module 100 is sensed, the BMS 60 switches the state of the power connection and disconnection part 70 to an OFF state to interrupt charge and discharge of the battery module 100. On the other hand, in a case in which the BMS 60 abnormally operates or does not operate at all, the BMS 60 does not perform any control. Consequently, the power connection and disconnection part 70 is kept in the ON state. As a result, charge and discharge of the battery module 100 are continuously performed even in such an abnormal state In a case in which the active controller as described above is used, however, it is necessary to supply external electric current to the BMS. If no electric current is supplied to the BMS, therefore, the BMS may not protect the battery pack. That is, the active controller checks a charge state of the battery and controls the battery using an electric signal. However, it is necessary to supply power to the active controller. Consequently, the active controller cannot be a fundamental solution when power is not normally supplied to the active controller.

In addition, gas may leak from the lithium secondary battery or a fire or explosion of the lithium secondary battery may occur when the lithium secondary battery is overcharged. As the lithium secondary battery is used as a high-voltage, high-capacity battery pack for vehicles, safety of the lithium secondary battery is important in preventing injury of people and damage to vehicles.

For this reason, it is necessary to provide a protection device for the battery pack to prevent leakage of gas from the overcharged lithium secondary battery or occurrence of a fire or explosion of the lithium secondary battery.

As an example of the protection device, an electrode terminal connection portion between the battery cells may be broken by swelling force of the battery cells to cut-off an electric connection circuit of the battery pack.

In the above protection device, however, it is necessary to lower strength of the electrode terminals or to reduce the thickness of the electrode terminals such that the electrode terminal connection portion between the battery cells can be easily broken. The electrode terminals manufactured as described above have low resistance to external force, such as vibration or impact.

In addition, large force equivalent to tensile strength of the electrode terminals is needed for the protection device to break the electrode terminal connection portion. To this end, it is necessary for the battery cells to be considerably overcharged such that the battery cells excessively swell. As a result, gas may easily leak from the battery or a fire or explosion of the battery may easily occur.

Therefore, there is a high necessity for technology that is capable of fundamentally securing safety of the battery pack while solving the above problems.

DISCLOSURE

Technical Problem

The present invention has been made to solve the above problems and other technical problems that have yet to be resolved.

As a result of a variety of extensive and intensive studies and experiments to solve the problems as described above, the inventors of the present application have found that, in a case in which a battery pack includes a circuit breaker and a cut-off portion, which have specific construction in the battery pack, the circuit breaker senses expansion in volume of the outside of battery cells when the battery cells swell due to abnormal operation, such as overcharge, overdischarge, or overcurrent, of battery modules or degradation of the battery cells caused by long-term charge and discharge of the battery cells and the circuit breaker short-circuits the cut-off portion to break it when the swelling of the battery cells exceeds a reference volume value, thereby securing safety of the battery pack to a desired level.

Therefore, it is an object of the present invention to provide a battery pack having a specific structure that is capable of improving safety.

Technical Solution

In accordance with one aspect of the present invention, the above and other objects can be accomplished by the provision of a battery pack configured such that a plurality of battery modules is connected to each other in series in a state in which the battery modules are in tight contact with each other or stacked adjacent each other, the battery pack being fixed such that a stacked state of the battery modules is maintained even when volume of the battery modules is changed during charge and discharge of the battery modules, the battery pack including a cut-off portion connected in series to an electrical connection circuit between the battery modules, a fixing member to fix a circuit breaker to at least one outer surface of the battery pack, and the circuit breaker configured to be electrically conducted when an outer surface of at least one battery module expands by a reference volume value or more, the circuit breaker being connected in series to the electrical connection circuit to short-circuit the cut-off portion when electric conduction is performed due to swelling of the battery modules In a battery pack including a power supply unit, to which plurality of battery cells or battery modules is connected, as previously described, a battery management system (BMS) detects an operation state of the power supply unit and controls charge and discharge of the power supply unit based on the detected operation state of the power supply unit, thereby securing safety of the battery pack. In a case in which the BMS does not operate due to interruption in supply of electric current, however, it is not possible to control charge and discharge of the power supply unit.

On the other hand, the battery pack according to the present invention includes a circuit breaker and a cut-off portion configured to operate independently of the BMS. When the power supply unit malfunctions, therefore, the circuit breaker senses only expansion in volume of the battery cells or the battery modules and short-circuits the cut-off portion based thereupon. As a result, electrical connection in the battery pack is interrupted and, therefore, overcurrent or overvoltage of the battery modules is prevented from being transmitted to an external input and output terminal, thereby securing safety of the battery pack.

In addition, the circuit breaker according to the present invention does not need additional power. As a result, there is no malfunction of the circuit breaker according to an electric signal and the circuit breaker normally operates without the supply of power. Consequently, reliability of the circuit breaker is very high.

In the present invention, each of the battery modules may include one or more battery cells. Each of the battery cells is preferably a plate-shaped battery cell, e.g. a secondary battery having a small thickness and a relatively large width and length so as to minimize the overall size of a battery module when the battery cells are stacked to constitute the battery module.

A preferred example of the secondary battery may be a secondary battery configured to have a structure in which an electrode assembly of a cathode/separator/anode structure is mounted in a battery case formed of a laminate sheet including a resin layer and a metal layer and a cathode terminal and an anode terminal protrude from opposite ends of the battery case. Specifically, the electrode assembly may be mounted in a pouch-shaped battery case formed of an aluminum laminate sheet. The secondary battery having the above structure may also be referred to as a 'pouch-shaped battery cell.'

However, the above battery cell is given only by way of illustration. It is obvious that the present invention may be applied to all types of battery cells, the expansion in volume of each of which is transmitted to the outside of a battery case of each of the battery cells.

Electrode terminal portions of the battery pack may be fixed such that a stacked state of the battery modules is maintained even when the volume of the battery cells is changed.

The cut-off portion is not particularly restricted so long as the cut-off portion can easily interrupt electrical connection in the battery pack when a short circuit occurs in the battery pack. For example, the cut-off portion may include a fuse.

Meanwhile, the fixing member may include a frame open at a middle thereof such that the circuit breaker contact the battery modules, the frame being fastened to the battery modules in an assembling manner.

In addition, the fixing member may be provided with one or more brackets to fix the circuit breaker in position, the brackets extending from the frame toward the open middle of the frame.

Location of the circuit breaker is not particularly restricted so long as the circuit breaker is located at a portion at which the circuit breaker can easily sense swelling of the battery cells. Preferably, the circuit breaker is located at a portion corresponding to a side of an outermost battery module.

In a case in which the circuit breaker is located at the side of the outermost battery module, on which expansion stress of the battery cells due to the expansion in volume of the battery cells concentrates, therefore, the circuit breaker can easily sense abnormality of the battery modules and electrically conduct the electrical connection circuit of the battery modules to short-circuit the cut-off portion. In addition, the circuit breaker can sense the expansion in volume of any overcharged battery cell and interrupt the electrical connection circuit of the battery pack before gas leaks from the battery cells or a fire or explosion of the battery cells occurs, thereby securing safety of the battery pack.

In a preferred example, the circuit breaker may include an electrically insulative housing fixed to the fixing member in position, the housing having a receiving part open at a top thereof, an electrically insulative cap mounted in the receiving part while being in contact with an side of one of the battery modules such that the cap can elastically move in response to the change in volume of the battery modules, an electrically conductive electric conduction connection member interlocked with the cap, and a conduction member including a cathode conduction part and an anode conduction part, each of which has one end located inside the receiving part such that one end comes into contact with the electric conduction connection member when the volume of the battery modules increases and the other end located outside the receiving pa such that the other end is connected in series to the electrical connection circuit between the battery modules.

Based on the physical or mechanical operation structure of the circuit breaker as described above, it is possible to secure safety of the battery pack even when the BMS malfunction. In addition, the battery pack according to the present invention mechanically operates through addition of a few simple components as described above, whereby the battery pack is easily manufactured and application of various structures is possible based thereupon.

When the electric conduction connection member contacts the conduction member during interruption of electrical connection in all of the battery modules due to the expansion in volume of the battery modules, a spark may be generated. If such a spark is discharged to the outside, another risk may be caused. However, the electrically insulative housing fundamentally prevents discharge of such a spark to the outside.

In a concrete example, the circuit breaker may further include at least one guide bolt, by which the cap is elastically mounted to the housing, a through hole formed through the cap and the electric conduction connection member such that the guide bolt can be inserted through the through hole, at least one compression spring mounted at a lower end of the electric conduction connection member, and a nut coupled to the guide bolt an opposite side of the receiving part of the housing.

Consequently, it is possible to elastically mount the cap to the housing and to effectively achieve connection between the electric conduction connection member and the conduction member when the battery modules swell.

The number of the guide bolts and the compression springs is not particularly restricted. For example, the at least one guide bolt may include two or more guide bolts and the at least one compression springs may include two or more compression springs to guarantee stable operation of the respective components. The circuit breaker may further include a bushing mounted between the compression spring and the bottom of the receiving part of the housing.

In a preferred example, the cap and the housing may each have an upwardly tapered structure in which one side or opposite sides of the cap and one side or opposite sides of the housing are tapered upward.

Specifically, interference may occur between the cap and the battery module when the frame, to which the circuit breaker is mounted, is fastened to the battery module in an assembling manner. In a case in which the upwardly tapered structure is formed at the side of the cap, the cap is pushed into the interior of the housing toward the guide bolt by the upwardly tapered structure. As a result, it is possible to achieve stable assembly and fastening between the frame and the battery module.

The housing may be provided at a side wall thereof defining the receiving part with a slit, through which a spacing distance between the electric conduction connection member and the conduction member can be observed or measured.

The distance between the electric conduction connection member and the conduction member is an important factor deciding circuit cut-off timing based on a degree of expansion in volume of the battery. Consequently, it is possible to change the spacing distance between the electric conduction connection men and the conduction member to a desired level by measuring the spacing distance through the slit and adjusting the nut respectively coupled to the guide bolt based on the measured spacing distance.

As a result, it is possible to easily set a reference volume value, based on battery module cut-off timing is decided, through the slit structure.

For example, it is possible to change the distance between the electric conduction connection member and the conduction member such that the circuit breaker can sense the change in volume of the battery cell and break a circuit of the battery pack when the volume of the battery cell increases by 1.5 to 5 times the thickness of the battery cell. Of course, however, such a setting range may be changed according to safety test standards of a desired battery pack.

In a preferred example, a cathode terminal of one outermost battery module and an anode terminal of the other outermost battery module may be electrically connected to the cathode conduction part and the anode conduction part of the circuit breaker via conductive wires, respectively.

In the above structure, the electric conduction connection member is electrically spaced apart from the conduction member in a state in which the battery modules normally operate. When the battery modules swell in a state in which the battery modules abnormally operate, the cap of the circuit breaker is pushed outward by the battery modules, the volume of which expands, with the result that opposite ends of the electric conduction connection member mounted in the cap come into contact with the cathode conduction part and the anode conduction part, whereby high electric current flows between the cathode conduction part and the anode conduction part and thus the cut-off portion short-circuits.

The battery pack according to the present invention may be manufactured by combining battery modules based on desired output and capacity. In addition, the battery pack according to the present invention may be used as a power source for an electric vehicle, a hybrid electric vehicle, a plug-in hybrid electric vehicle, or a power storage device in consideration of installation efficiency and structural stability. However, an applicable range of the battery pack according to the present invention is not limited thereto.

In accordance with another aspect of the present invention, therefore, there is provided a device including the battery pack with the above-stated construction as a power source. Specifically, the device may be an electric vehicle, a hybrid electric vehicle, a plug-in hybrid electric vehicle, or a power storage device.

The structure and a manufacturing method of the device are well known in the art to which the present invention pertains and, therefore, a detailed description thereof will be omitted.

DESCRIPTION OF DRAWINGS

The above and other objects, features and other advantages of the present invention will be more clearly understood from the following detailed description taken in conjunction with the accompanying drawings, in which:

FIG. 1 is a typical view showing circuitry of a conventional battery pack;

FIGS. 2 and 3 are perspective views showing a process of bending a pair of battery cells constituting a unit module according to the present invention;

FIG. 4 is a perspective view showing a unit module stack according to the present invention;

FIG. 5 is a perspective view showing a circuit breaker according to an embodiment of the present invention;

FIG. 6 is an exploded view showing the circuit breaker of FIG. 5;

FIG. 7 is a side view showing the circuit breaker according to the embodiment of the present invention;

FIG. 8 is a partially enlarged view of FIG. 7;

FIG. 9 is a side view showing an assembled state of a battery pack according to an embodiment of the present invention;

FIG. 10 is a view showing circuitry of the battery pack according to the embodiment of the present invention;

FIG. 11 is a partial perspective view showing one side of the battery pack of FIG. 10;

FIG. 12 is a plan view showing a state before operation of a circuit breaker of FIG. 10; and FIG. 13 is a plan view showing a state after operation of the circuit breaker of FIG. 10.

BEST MODE

Now, exemplary embodiments of the present invention will be described in detail with reference to the accompanying drawings. It should be noted, however, that the scope of the present invention is not limited by the illustrated embodiments.

FIGS. 2 and 3 are perspective views typically showing a process of bending a pair of battery cells constituting a unit module according to an embodiment of the present invention and FIG. 4 is a perspective view typically showing a unit module stack according to the present invention.

Referring to these drawings, in a state in which two pouch-shaped battery cells 11 and 12 are arranged in series in the longitudinal direction such that electrode terminals 13 and 14 of the pouch-shaped battery cells 11 and 12 are successively adjacent to each other, the electrode terminals 13 and 14 of the pouch-shaped battery cells 11 and 12 are welded to each other and then the pouch-shaped battery cells 11 and 12 are folded such that the pouch-shaped battery cells 11 and 12 overlap each other. According to circumstances, the electrode terminals 13 and 14 of the pouch-shaped battery cells 11 and 12 may he coupled to each other by welding in a state in which the electrode terminals are folded such that the electrode terminals overlap each other.

In addition, as shown in FIG. 3, an electrode terminal connection portion 15, at which the electrode terminals are coupled by welding, of a battery cell stack 100*a* constituted by the folded pouch-shaped battery cells is bent in a bracket shape.

A unit module stack 200 is configured to have a structure in which four unit modules 202, 203, 204, and 205, each of which is manufactured to have a structure in which battery cells are covered by sheathing members 210, are stacked in zigzags in a state in which the unit modules 202, 203, 204, and 205 are connected to one another in series.

In addition, the unit module 202 includes two battery cells 11 and 12 configured to have a stacked structure in which electrode terminals 13 and 14 are connected to each other in series and an electrode terminal connection portion 15 of the electrode terminals 13 and 14 is bent and a pair of sheathing members 210 coupled to fully cover the outside of the battery cell stack 100*a* excluding the electrode terminals 13 and 14.

Linear protrusions 211*a*, 211*b*, 211*c*, 211*d*, and 211*e* are formed at the outside of each of the sheathing members 210 in a state in which the linear protrusions 211*a*, 211*b*, 211*c*, 211*d*, and 211*e* are spaced apart from one another in the lateral direction. The linear protrusions 211*a* and 211*e*, which have a small length in the lateral direction, are disposed diagonally to each other.

Each of the sheathing members 210 has an inner structure corresponding to an outer shape of the battery cell stack 100*a*. The sheathing members 210 are coupled to each other by assembly and fastening.

Specifically, sectional coupling portions of the sheathing members 210 are coupled to each other by fastening protrusions and fastening grooves such that, when the sheathing members 210 are pushed to each other in a state in which the sheathing members 210 are in contact with each other so as to face each other, the sheathing members 210 are engaged with each other by elastic coupling.

FIG. 5 is a perspective view showing a circuit breaker according to an embodiment of the present invention and FIG. 6 is an exploded view showing the circuit breaker of FIG. 5.

Referring to these drawings together with FIG. 11, a circuit breaker 500 includes an electrically insulative housing 550 fixed to a frame 400 in position, the housing 550 having a receiving part open at the top thereof, an electrically insulative cap 520 mounted in the receiving part 551 while being in contact with one side 211c of a battery module 301 such that the cap 520 can elastically move in response to the change in volume of the battery module 301, an electrically conductive electric conduction connection member 530 interlocked with the cap 520, and a conduction member 560 including a cathode conduction part 561 and an anode conduction part 562, each of which has one end located inside the receiving part 551 such that one end comes into contact with the electric conduction connection member 530 when the volume of the battery module increases and the other end located outside the receiving part 551 such that the other end is connected in series to an electrical connection circuit of the battery modules 301 and 302.

In addition, the circuit breaker 500 further includes two guide bolts 511 and 512, by which the cap 520 is elastically mounted to the housing 550, through holes 521, 522, 511, and 532 formed through the cap 520 and the electric conduction connection member 530 such that the guide bolts 511 and 512 can be inserted through the through holes 521, 522, 531, and 532, two compression springs 541 and 542 mounted at the lower end of the electric conduction connection member 530, and nuts 581 and 582 respectively coupled to the guide bolts 511 and 512 at the opposite side of the receiving part 551 of the housing.

Between the compression springs 541 and 542 and the bottom of the receiving part 551 of the housing are mounted bushings 571 and 572, respectively.

FIG. 7 is a side view showing the circuit breaker according to the embodiment of the present invention and FIG. 8 is a partially enlarged view of FIG. 7. In addition, FIG. 9 is a side view showing an assembled state of a battery pack according to an embodiment of the present invention.

Referring to these drawings, the cap 520 and the housing 550 of the circuit breaker 500 respectively have upwardly tapered structures 523 and 553 in which opposite sides of the cap 520 and the housing 550 are tapered upward.

When the frame 400, to which the circuit breaker 500 is mounted, is fastened to the battery module 301 (601 and 602) in an assembling manner, therefore, the cap 520 is pushed into the interior 551 of the housing 550 toward the guide bolts 511 and 512 by the upwardly tapered structures 523 and 533 formed at the sides of the cap 520. As a result, excessive force is not applied to components of the battery module 301.

In addition, the housing 550 is provided at the side wall thereof defining the receiving part 551 with a slit 552, through which a spacing distance d between the electric conduction connection member 530 and the conduction member 560 can be observed or measured.

Consequently, it is possible to change the spacing distance between the electric conduction connection member 530 and the conduction member 560 by measuring the spacing distance through the slit 552 and adjusting the nuts 581 and 582 respectively coupled to the guide bolts 511 and 512 based on the measured spacing distance.

Specifically, it is possible to change the spacing distance d between the electric conduction connection member 530 and the conduction member 560 such that the circuit breaker 500 can sense the change in volume of the battery cell 100a and break a circuit of the battery pack When the volume of the battery cell 100a increases, for example, by about three times the thickness of the battery cell 100a.

FIG. 11 is a partial perspective view showing one side of the battery pack.

Referring to FIG. 11, the circuit breaker 500 is fixed to a bracket 402 extending from an edge 401 of the frame 400 open at the middle thereof toward the middle of the frame 400 such that the circuit breaker 500 can easily contact the side 211c of the battery module 301.

In a case in which the circuit breaker 500 is located at the side 211c of the battery module 301, on which expansion stress of the battery cell 100a due to the expansion in volume of the battery cell 100a concentrates, as described above, the circuit breaker 500 can easily sense abnormality of the battery modules 301 and 302 and electrically conduct the electrical connection circuit of the battery modules 301 and 302 to short-circuit a cut-off portion 800.

In addition, the circuit breaker 500 can sense the expansion in volume of any overcharged battery cell and interrupt the electrical connection circuit of the battery pack before gas leaks from the battery cell or a fire or explosion of the battery cell occurs, thereby securing safety of the battery pack.

FIG. 10 is a view typically showing circuitry of a battery pack according to an embodiment of the present invention.

Referring to FIG. 10, a battery pack 700 includes a cut-off portion 800 connected in series to an electrical connection circuit 801 between battery modules 301 and 302 and a circuit breaker 500 mounted at the outside of the outermost battery module 301 to perform electric conduction when battery cells swell. The circuit breaker 500 is electrically connected to the electrical connection circuit 801 to break the cut-off portion 800 when electric conduction is performed due to swelling of the battery cells.

A cathode terminal 304 of one outermost battery module 301 and an anode terminal 306 of the other outermost battery module 302 are electrically connected to a cathode conduction part 561 and an anode conduction part 562 of the circuit breaker 500 via wires respectively.

In addition, in the battery pack 700, electrode terminal portions are fixed such that a stacked state of the battery modules 301 and 302 is maintained even when volume of the battery cells is changed and the circuit breaker 500 is located at a portion corresponding to the side of the outermost battery module 301 on which expansion stress of the battery cells due to swelling of the battery cells concentrates. Consequently, it is possible to fundamentally prevent malfunction of the battery pack according to an electric signal supply power.

Specifically, in a state in which the battery modules 301 and 302 are normal, the circuit breaker 500 is cut off. As a result, electric current generated by the battery modules 301 and 302 does not flow to the cathode conduction part 561 and the anode conduction part 562. Consequently, the cut-off portion 800 is not broken unless overcurrent flows in the electrical connection circuit 801 due to any other causes. Electric current from the battery pack 700 normally flows to an external device (not shown) via an external input and output terminal (not shown).

On the other hand, in a case in which the battery modules 301 and 302 are abnormal, for example, in a case in which overcurrent flows in the battery modules 301 and 302, the battery cells swell with the result that expansion force of the battery cells is transmitted to the outermost battery module 301.

The expansion force is transmitted to the circuit breaker 500 located at the side of the outermost battery module 301 to perform electric conduction between the cathode conduction part 561 and the anode conduction part 562 of the circuit breaker 500.

High electric current flows in the electrical connection circuit 801 of the battery pack 700 due to such electric conduction. As a result, the cut-off portion 800 is broken and, therefore, no electric current flows in the electrical connection circuit 801 of the battery pack 700.

FIG. 12 is a plan view typically showing a state before operation of a circuit breaker of FIG. 10 and FIG. 13 is a plan view typically showing a state after operation of the circuit breaker of FIG. 10.

Hereinafter, operation of the circuit breaker 500 in a state in which the battery modules 301 and 302 normally operate and in a state in which the battery modules 301 and 302 abnormally operate will be described with reference to these drawings together with FIG. 10.

First, in a state in which the battery modules 301 and 302 normally operate, as shown in FIG. 12, the electric conduction connection member 530 and the conduction member 561 and 562 are electrically or mechanically spaced apart from each other.

On the other hand, when the battery cells swell in a state in which the battery modules 301 and 302 abnormally operate, as shown in FIG. 13, the electric conduction connection member 530 is pushed outward by the battery module 301, the volume of which expands. As a result, opposite ends of the electric conduction connection member 530 come into contact with the cathode conduction part 561 and the anode conduction part 562. Consequently, high electric current flows between the cathode conduction part 561 and the anode conduction part 562, whereby the cut-off portion 800 can short-circuit.

Specifically, the cathode terminal 304 of one outermost battery module 301 and the anode terminal 306 of the other outermost battery module 302 are electrically connected to the cathode conduction part 561 and the anode conduction part 562 of the circuit breaker 500 via the wires, respectively.

In addition, in a state in which the battery modules 301 and 302 normally operate, the electric conduction connection member 530 is electrically spaced apart from the cathode conduction part 561 and the anode conduction part 562 of the conduction member 560.

However, when the battery cells swell in a state in which the battery modules 301 and 302 abnormally operate (see a dotted line 301" of FIG. 13), the cap 520 and the electric conduction connection member 530 are elastically pushed outward by the outermost battery module 301, the volume of which expands, via the compression springs 541 and 542 and the opposite ends of the electric conduction connection member 530 come into contact with the cathode conduction part 561 and the anode conduction part 562 of the conduction member 560, respectively. As a result, electric current flows between the cathode conduction part 561 and the anode conduction part 562.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a battery pack is configured to include a circuit breaker and a cut-off portion such that the circuit breaker senses expansion volume of the outside of battery cells when the battery cells swell due to abnormal operation, such as overcharge, overdischarge, or overcurrent, of battery modules or degradation of the battery cells caused by long-term charge and discharge of the battery cells and the circuit breaker breaks the cut-off portion when the swelling of the battery cells exceeds a reference volume value, thereby securing safety of the battery pack to a desired level.

In addition, the battery pack according to the present invention does not need power. As a result, it is possible to fundamentally prevent malfunction of the battery pack according to an electric signal and, even when power is not supplied to the BMS and, therefore, the BMS does not operate, it is possible to secure safety of the battery pack and to greatly improve reliability of the battery pack.

Furthermore, the battery pack mechanically operates through addition of a few simple components, whereby the battery pack is easily manufactured and variously manufactured based thereupon.

The invention claimed is:

1. A battery pack configured such that a plurality of battery modules are connected to each other in series in a state in which the battery modules are in tight contact with each other or stacked adjacent to each other, the battery pack being fixed such that a stacked state of the battery modules is maintained even when volume of the battery modules is changed during charge and discharge of the battery modules, the battery pack comprising:
   a cut-off portion connected in series to an electrical connection circuit between the battery modules;
   a fixing member to fix a circuit breaker to at least one outer surface of the battery pack; and
   the circuit breaker configured to be electrically conducted when an outer surface of at least one battery module expands by a reference volume value or more, the circuit breaker being connected in series to the electrical connection circuit to short-circuit the cut-off portion when electric conduction is performed due to swelling of the battery modules,
   wherein the circuit breaker comprises:
      an electrically insulative housing fixed to the fixing member in position, the housing having a receiving part open at a top thereof;
      an electrically insulative cap mounted in the receiving part while being in contact with a side of one of the battery modules such that the cap can elastically move in response to the change in volume of the battery modules;
      an electrically conductive electric conduction connection member interlocked with the cap; and
      a conduction member comprising a cathode conduction part and an anode conduction part, each of which has one end located inside the receiving part such that one end comes into contact with the electric conduction connection member when the volume of the battery modules increases and the other end located outside the receiving part such that the other end is connected in series to the electrical connection circuit between the battery modules.

2. The battery pack according to claim 1, wherein each of the battery modules comprises one or more battery cells.

3. The battery pack according to claim 2, wherein each of the battery cells is a pouch-shaped battery cell having an electrode assembly mounted in a case formed of a laminate sheet comprising a resin layer and a metal layer.

4. The battery pack according to claim 1, wherein electrode terminal portions of the battery pack are fixed such that the stacked state of the battery modules is maintained even when the volume of the battery modules is changed.

5. The battery pack according to claim 1, wherein the cut-off portion comprises a fuse.

6. The battery pack according to claim 1, wherein the fixing member comprises a frame open at a middle thereof such that the circuit breaker contacts the battery modules, the frame being fastened to the battery modules in an assembling manner.

7. The battery pack according to claim 6, wherein the fixing member is provided with one or more brackets to fix the circuit breaker in position, the one or more brackets extending from the frame toward the open middle of the frame.

8. The battery pack according to claim 1, wherein the circuit breaker further comprises at least one guide bolt, by which the cap is elastically mounted to the housing, a through hole formed through the cap and the electric conduction connection member such that the guide bolt can be inserted through the through hole, at least one compression spring mounted at a lower end of the electric conduction connection member, and a nut coupled to the guide bolt at an opposite side of the receiving part of the housing.

9. The battery pack according to claim 8, wherein the at least one guide bolt comprises two or more guide bolts, and the at least one compression spring comprises two or more compression springs.

10. The battery pack according to claim 8, wherein the circuit breaker further comprises a bushing mounted between the compression spring and a bottom of the receiving part of the housing.

11. The battery pack according to claim 1, wherein the cap and the housing each have an upwardly tapered structure in which one side or opposite sides of the cap and one side or opposite sides of the housing are tapered upward.

12. The battery pack according to claim 1, wherein the housing is provided at a side wall thereof defining the receiving part with a slit, through which a spacing distance between the electric conduction connection member and the conduction member can be observed or measured.

13. The battery pack according to claim 1, wherein a cathode terminal of one outermost battery module and an anode terminal of the other outermost battery module are electrically connected to the cathode conduction part and the anode conduction part of the circuit breaker via conductive wires, respectively.

14. The battery pack according to claim 1, wherein the electric conduction connection member is electrically spaced apart from the conduction member in a state in which the battery modules normally operate.

15. The battery pack according to claim 1, wherein, when the battery modules swell in a state in which the battery modules abnormally operate, the cap of the circuit breaker is pushed outward by the battery modules, the volume of which expands, with the result that opposite ends of the electric conduction connection member mounted in the cap come into contact with the cathode conduction part and the anode conduction part, whereby high electric current flows between the cathode conduction part and the anode conduction part and thus the cut-off portion short-circuits.

16. A device comprising a battery pack according to claim 1 as a power source.

17. The device according to claim 16, wherein the device is an electric vehicle, a hybrid electric vehicle, a plug-in hybrid electric vehicle, or a power storage device.

* * * * *